United States Patent
Fusco et al.

(10) Patent No.: US 11,663,407 B2
(45) Date of Patent: May 30, 2023

(54) MANAGEMENT OF TEXT-ITEM RECOGNITION SYSTEMS

(71) Applicant: International Business Machines Corporation, Armonk, NY (US)

(72) Inventors: Francesco Fusco, Zurich (CH); Abderrahim Labbi, Gattikon (CH); Peter Willem Jan Staar, Wädenswil (CH)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 17/109,196

(22) Filed: Dec. 2, 2020

(65) Prior Publication Data
US 2022/0171931 A1 Jun. 2, 2022

(51) Int. Cl.
*G06F 40/284* (2020.01)
*G06F 40/169* (2020.01)
*G06F 18/2413* (2023.01)
*G06N 20/00* (2019.01)

(52) U.S. Cl.
CPC ...... *G06F 40/284* (2020.01); *G06F 18/24147* (2023.01); *G06F 40/169* (2020.01); *G06N 20/00* (2019.01)

(58) Field of Classification Search
CPC .... G06F 40/284; G06F 40/169; G06F 40/295; G06K 9/6276; G06N 20/00; G06N 5/025; G06N 7/005
See application file for complete search history.

(56) References Cited

U.S. PATENT DOCUMENTS

| | | | | |
|---|---|---|---|---|
| 6,311,152 | B1* | 10/2001 | Bai | G06F 40/289 704/251 |
| 7,610,191 | B2 | 10/2009 | Gao | |
| 8,499,008 | B2* | 7/2013 | Pennacchiotti | G06N 20/00 707/803 |

(Continued)

FOREIGN PATENT DOCUMENTS

JP 2004005648 A 1/2004

OTHER PUBLICATIONS

"Amazon Mechanical Turk", Amazon, retrieved from the Internet on Sep. 22, 2020, 4 pages, <https://www.mturk.com/>.

(Continued)

*Primary Examiner* — Akwasi M Sarpong
(74) *Attorney, Agent, or Firm* — Peter Suchecki (57) ABSTRACT

A tool for managing text-item recognition systems such as NER (Named Entity Recognition) systems. The tool applies the system to a text corpus containing instances of text items, such as named entities, to be recognized by the system, and selecting from the text corpus a set of instances of text items which the system recognized. The tool tokenizes the text corpus such that each instance in the aforementioned set is encoded as a single token and processing the tokenized text via a word embedding scheme to generate a word embedding matrix. The tool, responsive to selecting a seed token corresponding to an instance in the aforementioned set, performs a nearest-neighbor search of the embedding space to identify a set of neighboring tokens for the seed token, and identifies the text corresponding to each neighboring token as a potential instance of a text item to be annotated.

20 Claims, 4 Drawing Sheets

(56) References Cited

U.S. PATENT DOCUMENTS

| | | | | |
|---|---|---|---|---|
| 11,321,671 | B2* | 5/2022 | Bykov | G06Q 10/1053 |
| 2006/0074634 | A1* | 4/2006 | Gao | G06F 40/211 |
| | | | | 704/9 |
| 2011/0022550 | A1* | 1/2011 | Pennacchiotti | G06F 16/953 |
| | | | | 706/12 |
| 2015/0286629 | A1* | 10/2015 | Abdel-Reheem | G06F 40/295 |
| | | | | 704/9 |
| 2017/0060835 | A1* | 3/2017 | Radford | G06F 40/284 |
| 2018/0267958 | A1* | 9/2018 | Danielyan | G06F 40/131 |
| 2019/0007711 | A1 | 1/2019 | Geva | |
| 2019/0130073 | A1* | 5/2019 | Sun | G16H 10/60 |
| 2019/0325029 | A1* | 10/2019 | Gandhi | G06F 40/284 |
| 2021/0124877 | A1* | 4/2021 | Adel-Vu | G06F 40/279 |
| 2021/0326371 | A1* | 10/2021 | Bui | G06F 40/284 |
| 2022/0067579 | A1* | 3/2022 | Choi | G06N 5/02 |
| 2022/0093088 | A1* | 3/2022 | Rangarajan Sridhar | G06F 16/338 |

OTHER PUBLICATIONS

"Confidence to Deploy AI with World-Class Training Data", Appen, retrieved from the Internet on Sep. 22, 2020, 8 pages, <https://appen.com/>.

De Castilho et al., "A Web-based Tool for the Integrated Annotation of Semantic and Syntactic Structures", Proceedings of the Workshop on Language Technology Resources and Tools for Digital Humanities (LT4DH), Osaka, Japan, Dec. 11-17, 2016, pp. 76-84.

Devlin et al., "BERT: Pre-training of Deep Bidirectional Transformers for Language Understanding", Proceedings of NAACL-HLT 2019, pp. 4171-4186, Minneapolis, Minnesota, Jun. 2-Jun. 7, 2019, copyright 2019 Association for Computational Linguistics.

Mikolov et al., "Distributed Representations of Words and Phrases and their Compositionality", arXiv:1310.4546v1 [cs.CL] Oct. 16, 2013, 9 pages.

Neves et al., "An extensive review of tools for manual annotation of documents", Briefings in Bioinformatics, 00(0), 2019, Submitted: Oct. 5, 2019; Received (in revised form): Sep. 2019, pp. 1-18, doi: 10.1093/bib/bbz130.

Ennington et al., "GloVe: Global Vectors for Word Representation," Proceedings of the 2014 Conference on Empirical Methods in Natural Language Processing (EMNLP), Oct. 25-29, 2014, Doha, Qatar, pp. 1532-1543, copyright 2014 Association for Computational Linguistics.

Radford et al., "Language Models are Unsupervised Multitask Learners", Published 2019, Computer Science, 27 pages.

Stenetorp et al., "BRAT: a Web-based Tool for NLP-Assisted Text Annotation", Proceedings of the 13th Conference of the European Chapter of the Association for Computational Linguistics, pp. 102-107, Avignon, France, Apr. 23-27, 2012, copyright 2012 Association for Computational Linguistics.

* cited by examiner

MANAGEMENT OF TEXT-ITEM RECOGNITION SYSTEMS

BACKGROUND OF THE INVENTION

The present invention relates generally to management of text-item recognition systems. Computer-implemented methods are provided for managing these systems, together with apparatus and computer program products implementing such methods.

Text-item recognition systems can process text data to identify instances of text-items referring to particular things, or types of things, in the text. These systems can be designed to identify instances of any type of text items, comprising sequences of one or more words in a text, which refer to predefined things or types of things, whether real or abstract, including objects, entities, names, concepts, technical terms, and so on. Named Entity Recognition (NER) systems provide one example of such systems. NER systems can locate references to named entities and assign these to defined categories (entity-types) such as people, companies, products, medical codes, network protocols, geographical locations, and so on. An entity itself may be physical, such as a car, or abstract, such as a network protocol or technical concept. For example, a reference to "IBM Corporation" within a text may be an instance of an entity-type "company" or "organization", and a reference to "HTTP" may be an instance of an entity-type "network protocols". As these examples demonstrate, an instance of a text item may be a single word, such as "HTTP", or a sequence of more than one word, such as "IBM Corporation".

Text item recognition systems can be implemented with rule-based approaches, using pattern or dictionary matching to identify words in text and determine if they satisfy predefined rules for qualification as an instance of a text item which the system is designed to recognize. Machine learning (ML) models are more commonly used, however. ML models can be trained via a supervised learning process in which a training set of text samples, annotated to indicate locations of text-item instances, is supplied to the model. The model output for each training sample is compared with the annotation (or "label") for the sample to calculate an error which is used to update the model parameters. As the training process iterates over the training dataset, the model parameters are progressively updated as the model "learns" to recognize instances of the required text items. After training, the model can be applied for inference to identify such instances in new (previously unseen) text.

SUMMARY

One aspect of the present invention provides a computer-implemented method for managing a text-item recognition system. The method includes applying the system to a text corpus containing instances of text items to be recognized by the system and selecting from the text corpus a set of instances of text items which the system recognized. The method also includes tokenizing the text corpus such that each instance in the aforementioned set is encoded as a single token and processing the tokenized text via a word embedding scheme to generate a word embedding matrix. This matrix comprises vectors which indicate locations of respective tokens in a word embedding space. The method further comprises, in response to selection of a seed token corresponding to an instance in the aforementioned set, performing a nearest-neighbor search of the embedding space to identify a set of neighboring tokens for the seed token and, for at least a subset of the neighboring tokens, identifying the text corresponding to each neighboring token as a potential instance of a text item to be annotated for improving operation of the system.

Methods embodying the invention exploit a specialized data structure in the form of the word-embedding matrix which is generated and used in a particular manner to perform error analysis and instance identification for improving operation of text-item recognition systems. This technique enables effective automation of a process which previously required significant manual effort by system engineers. By using instances of text items recognized by the system as single tokens in the word embedding, and as seeds for searching the embedding space, error analysis can be targeted to an area of particular interest and the potential instances identified are most likely to have impact in improving system operation. As a result, annotation effort for improving system performance can be significantly reduced and also focused towards obtaining maximum benefit.

In preferred embodiments, the text-item recognition system comprises an NER system, such as NER system 46, and the instances of text items comprise instances of named entities. As discussed above, however, embodiments can be readily applied to systems designed to recognize other types of text item.

Depending on operation of the text-item recognition system, the selected set of instances recognized by the system may comprise all, or a subset of, the recognized instances. Where the system provides a confidence value for each recognized instance (as is commonly the case for ML systems), preferred methods include selecting instances of text items having confidence values above a threshold for inclusion in the aforementioned set. This feature ensures that only instances recognized with high-confidence are encoded as such when generating the word embedding matrix and provide the anchors, or seeds, for subsequent searches in the embedding space. This increases the likelihood that potential instances of text items identified by the process are indeed correct and should have been recognized with higher confidence by the system.

For rule-based recognition systems, potential instances of text items identified by the above process can be annotated by inspection and approval as instances for addition to dictionaries and rule-sets. In preferred embodiments, however, the text-item recognition system comprises a machine learning model. In these embodiments, the method includes, for text identified as a potential instance of a text item, storing at least one fragment of the text corpus which includes that text as a text sample to be annotated. In response to annotation of a set of such text samples, these embodiments can then train the model using the annotated text samples as training samples. The ML recognition system can thus be dynamically improved via an iterative process of error analysis and further training.

The text fragments stored as samples for annotation are preferably selected via a further process which filters the best fragments for annotation from a candidate set of text fragments. This filtering process involves extracting from the text corpus a plurality of text fragments which are referred to herein as "seed text fragments". Each seed text fragment comprises a fragment of the text corpus which includes an instance corresponding to the seed token. A vector representation of each seed text fragment is generated based on a word-embedding of the fragment in an embedding space. In addition, for the set of neighboring tokens identified via the search, a further plurality of text fragments, referred to herein as "candidate text fragments", are extracted from the text corpus. Each candidate text fragment includes text corresponding to a neighboring token. A vector representation of each candidate text fragment is generated as for the seed text fragments. These embodiments then compute, for each candidate text fragment, a distance value indicative of distance between the vector representation of that candidate text fragment and the vector representations of the seed text fragments. The text corresponding to the neighboring token in each candidate text fragment with less than a threshold distance value is then identified as a potential instance of a text item to be annotated. These text fragments are stored as text samples to be annotated. This process enables annotation efforts to be focused on instances which appeared in the text in similar contexts to the seed and are thus most likely to correspond to system errors.

Where recognition systems provide a confidence value for each recognized instance, the filtering process described above can be advantageously tailored to particular confidence bands. In particular, where the selected set of instances recognized by the system comprises instances with a confidence value above a first threshold, the candidate text fragments can be selected from text fragments which include text, corresponding to a neighboring token, that the system recognized as an instance of a text item with a confidence value between the first threshold and a second, lower threshold. This allows the system management process to focus on improving system operation in a desired manner, e.g. to improve recognition confidence for particular text items of interest and/or achieve specified requirements for precision and/or recall.

Preferred embodiments provide a dedicated user interface for user-selection of the seed token for the search. Such a user interface can be adapted for selection of a seed token by prompting selection, by the user, of an item-instance from the set of instances of text items which the system recognized and formed the basis for the word embedding matrix. This process can be repeated for further seed tokens. In response to user-selection of a plurality of seed tokens via the user interface, preferred embodiments can perform a nearest-neighbor search, and identify text corresponding to neighboring tokens identified by that search as potential item-instances, for each of the user-selected seed tokens. This allows a user to direct identification of further annotation samples, targeted to a particular area of interest, quickly and with minimal effort.

Respective further aspects of the invention provide a computing apparatus which is adapted to implement a method for managing a text-item recognition system as described above, and a computer program product comprising a computer readable storage medium embodying program instructions, executable by a computing apparatus, to cause the computing apparatus to implement such a method.

Embodiments of the invention will be described in more detail below, by way of illustrative and non-limiting example, with reference to the accompanying drawings.

DETAILED DESCRIPTION

Embodiments of the present invention recognize that the performance of text-item recognition systems is ultimately dependent on quality of the training dataset (for ML systems), or dictionaries and rules (for rule-based systems). ML systems rely on annotation of large quantities of text to provide labeled training samples for supervised machine learning. Rule-based systems also use annotated text as ground truth data for validating system operation. Operation of both types of system is subject to constant manual review and maintenance. Embodiments of the present invention further recognize that where system performance (e.g. precision and/or recall) is below requirements, error analysis must be performed, and appropriate improvements made. Moreover, different applications of a system may have different requirements, such as focusing on named entities or other text-items in particular fields or technical areas, or different required standards for precision and recall. Embodiments of the present invention recognize that maintaining and modifying systems to meet all necessary requirements involves significant manual effort. In addition, generating sufficient annotated text, particularly for ML systems, is both time consuming and expensive, especially for complex technology and other specialized applications.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments to be described can be performed as computer-implemented methods for managing TIR systems. The methods may be implemented by computing apparatus comprising one or more general- or special-purpose computers, each of which may comprise one or more (real or virtual) machines, providing functionality for implementing the operations described herein. Steps of methods embodying the invention may be implemented by program instructions, e.g. program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

Figure 1:
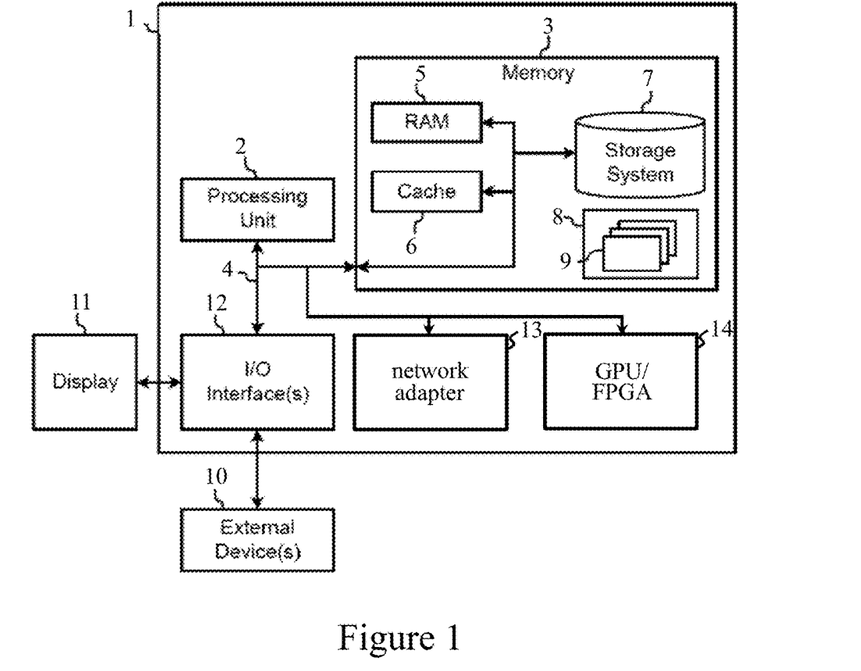
FIG. 1 is a schematic representation of a computing apparatus for implementing methods embodying the invention.

FIG. 1 is a block diagram of exemplary computing apparatus for implementing methods embodying the invention. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the invention. By way of example, program/utility 8, having a set (at least one) of program modules 9, may be stored in memory 3, as well as an operating system, one or more application programs, other program modules, and program data. Each of the operating systems, one or more application programs, other program modules, and program data, or some combination thereof, may include an implementation of a networking environment. Program modules 9 generally carry out the functions and/or methodologies of embodiments of the invention as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. Computer 1 may also communicate with additional processing apparatus 14, such as a GPU (graphics processing unit) or FPGA, for implementing embodiments of the invention. It should be understood that although not shown, other hardware and/or software components could be used in conjunction with computer 1. Examples include, but are not limited to microcode, device drivers, redundant processing units, external disk drive arrays, RAID systems, tape drives, and data archival storage systems, etc.

Figure 2:
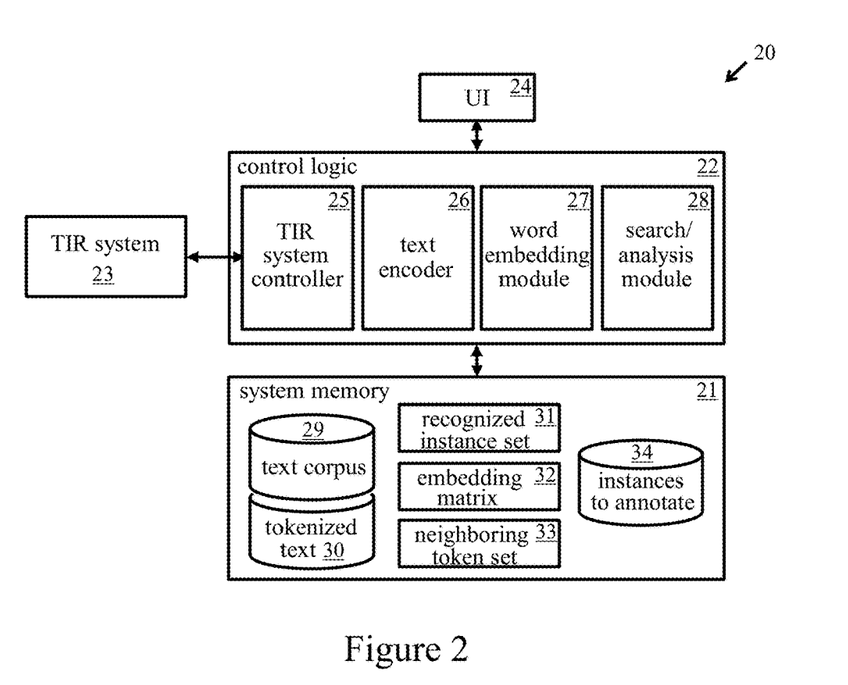
FIG. 2 illustrates component modules of apparatus embodying the invention for managing a text-item recognition (TIR) system.

The FIG. 2 schematic illustrates component modules of computing apparatus for implementing a TIR system management method embodying the invention. The system 20 comprises memory 21 and control logic, indicated generally at 22, comprising functionality for managing a TIR system 23. TIR system 23, which can be implemented in a known manner, may be local or remote from system 20 and may be integrated with the system in some embodiments. A user interface (UI) 24 provides for interaction between control logic 22 and system users during management operations. UI 24 is conveniently implemented as a graphical user interface (GUI), described further below, which is adapted to prompt and assist a user providing inputs for the management process.

The control logic 22 comprises a TIR system controller 25, a text encoder 26, a word embedding module 27, and a search/analysis module 28. Each of these modules comprises functionality for implementing particular steps of the system management process detailed below. These modules interface with memory 21 which stores various data structures used in operation of system 20. These data structures include a text corpus 29, a tokenized text 30 generated by text encoder 26, and a recognized instance set 31 of text-item instances recognized by TIR system 23 from text corpus 29. Memory 21 also stores a word embedding matrix 32 which is generated by embedding module 27, and a set 33 of neighboring tokens, explained below, which are identified by search module 28. A set 34 of potential text-item instances which the apparatus identifies for annotation is also stored in system memory 21.

In general, functionality of control logic modules 25 through 28 may be implemented by software (e.g., program modules) or hardware or a combination thereof. Functionality described may be allocated differently between system modules in other embodiments, and functionality of one or more modules may be combined. The component modules of management system 20 may be provided in one or more computers of a computing system. For example, all modules may be provided in a computer 1 at which a UI 24 is provided for operator input, or modules may be provided in one or more computers/servers to which user computers can connect via a network (where the network may comprise one or more component networks and/or internetworks, including the Internet). A UI 24 for user input may be provided at one or more user computers operatively coupled to the system, and system memory 21 may be implemented by one or memory/storage components associated with one or more computers of management system 20.

Figure 3:
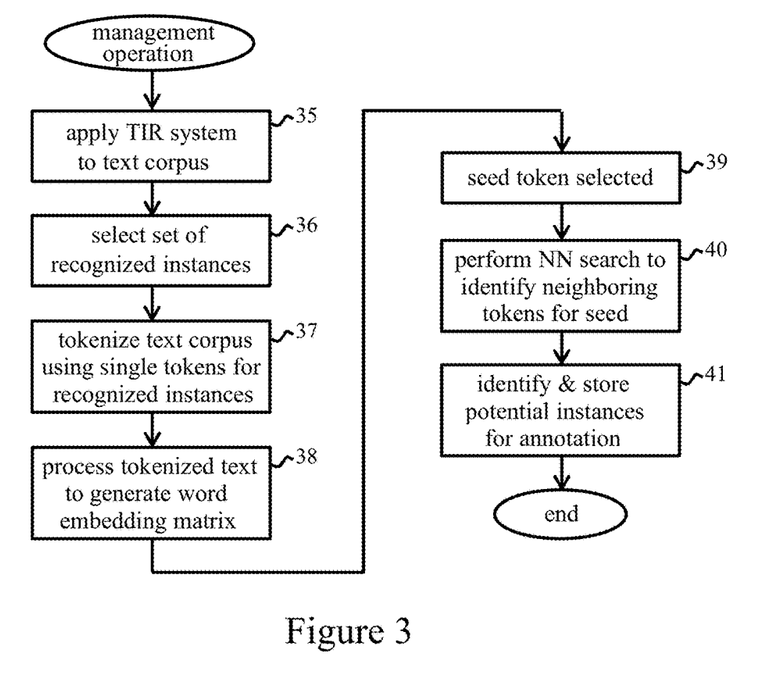
FIG. 3 indicates steps of a TIR system management method performed by the FIG. 2 apparatus.

FIG. 3 indicates steps of a TIR system management operation in the FIG. 2 apparatus. In step 35, TIR system controller 25 controls operation of TIR system 23 to apply the system for inference on the text corpus 29. This text corpus 29 contains instances of text items, such as named-entities, which TIR system 23 is designed to recognize, and may be obtained or collated from one or more information sources, e.g. databases and/or websites, prior to operation. In step 36, the TIR controller selects, from the instances of text items recognized by the TIR system 23, a recognized instance set 31. In a simple embodiment, recognized instance set 31 may comprise all of the text-item instances recognized by the TIR system 23. Selection of recognized instance set 31 in preferred embodiments is explained in detail below.

In step 37, text encoder 26 tokenizes the text corpus 29 to encode words (and in some cases sequences of words) in the text as respective tokens. In particular, any text-item instance (which may be a single word or a sequence of two or more words) in recognized instance set 31 is encoded as a single token in the tokenized text 30. For example, if recognized instance set 31 contains a recognized instance of a company name such as "COMPANY_IBM_Corporation", then the two words "IBM Corporation" will be encoded as a single token. If there is more than one recognized instance of "COMPANY_IBM_Corporation" in recognized instance set 31, the same token will appear in the encoded text for each instance. All other words (not being recognized instances) in the text may be encoded as respective single tokens. One-hot encoding is conveniently employed for the tokenization process, though other encoding schemes can of course be envisaged. Each token thus represents a particular word or item instance, whereby tokens are effectively word/ item-instance identifiers. (Some embodiments may also encode certain word-sequences, such as compound words or multi-word expressions, as single tokens, but this is orthogonal to the operation described herein). While all words in text corpus 29 may be encoded in the tokenization process, text encoder 26 may preprocess the text to remove stop words (such as "a", "and", "was", etc.,) to reduce complexity of the encoding process, and resulting tokenized text 30, without meaningful loss of context information.

In step 38, the tokenized text 30 generated by text encoder 26 is stored in system memory 21. Word embedding module 27 then processes the tokenized text 30 via a word embedding scheme to generate the word embedding matrix 32. Word embedding schemes are well-known, and essentially generate a mapping between tokens and vectors of real numbers which define locations of respective tokens in a multidimensional embedding space. The relative locations of tokens in this space are indicative of the degree of relationship between the words/item-instances encoded by the tokens, with tokens which are "closer" in the embedding space being more closely related than those which are further apart. In particular, the idea of word embeddings is to map tokens appearing in similar text contexts to be close to each other in the embedding space. Any desired word embedding scheme may be employed here, such as the GloVe (Global Vectors) and Word2Vec algorithms for instance. A word embedding scheme can generate "clouds" of tokens (and hence in our case text-item instances), which appear in similar contexts in the text and therefore represent semantically similar concepts. The resulting word embedding matrix comprises a vector corresponding to each token in the tokenized text 30.

Step 39 represents receipt by search/analysis module 28 of a selected seed token which corresponds to a text-item instance in recognized instance set 31. In preferred embodiments, the seed token is selected by user input via UI 24 as described below. In response to selection of the seed token, in step 40 the module 28 performs a nearest-neighbor (NN) search of the embedding space defined by word embedding matrix 32 to identify a set of neighboring tokens for the seed token. In this embodiment, the search locates the k nearest tokens to the seed token, where k may be a predefined parameter for the system or may be set by user input for a given search. For example, a typical value for k may be in the range $5 \leq k \leq 40$, with smaller values of k targeting the search more closely to the domain of interest. Various alternatives can be envisaged for identifying the neighboring tokens here. The search may, for example, return all neighboring tokens within a specified distance of the seed token, or a maximum of k tokens with a defined distance. To identify the nearest neighbors, the "distance" been two tokens can be computed as the cosine similarity between the two vectors in matrix 32 which define the locations of these tokens in the embedding space. Any convenient distance measure may be used in other embodiments.

The set 33 of neighboring tokens identified by the search is stored in system memory 21. In step 41, search/analysis module 28 uses the neighboring tokens to identify potential instances of text items which were "missed" by the TIR system 23, i.e. instances which were not recognized (or not recognized with sufficient confidence in preferred embodiments below). In particular, for at least a subset of the neighboring tokens in set 33, module 28 identifies the text corresponding to each neighboring token as a potential instance of a text item to be annotated. In a simple embodiment here, text corresponding to all neighboring tokens (or all neighboring tokens not already corresponding to recognized instance set 31) may be identified as potential instances for annotation. Preferred embodiments employ a filtering process, detailed below, to select a subset of the "best" instances for annotation. The selected text (or, in preferred embodiments below, a fragment of text corpus 29 which includes that text) is then stored in the set 34 of instances to be annotated for improving operation of TIR system 23.

It will be seen that the above process exploits a word embedding matrix generated using text items recognized by TIR system 23 as single tokens in the embedding. A recognized text item is also used as a seed for the subsequent search of the embedding space to identify potential errors (missed instances) by the TIR system 23. Selection of a particular seed token allows the error analysis to be targeted to a particular area of interest, and the neighboring tokens in the embedding space correspond to text appearing in similar contexts to the seed token. This text is therefore more likely to represent similar instances of text items which the system missed. For example, if the process is applied to a NER system 46, in close neighbourhood of a seed token for "COMPANY_IBM", there may be a token "COMPANY_International_Business_Machines", but also tokens such as "IBM" where the NER system 46 was not able to correctly detect "IBM" as a named entity (or, in preferred embodiments below, was only able to detect it with a confidence lower than a specified threshold). Annotation effort can thus be focussed on a particular area of interest and also on text samples likely to improve TIR system performance.

Steps 39 to 41 of FIG. 3 can of course be iterated for further seed tokens to supplement the annotation set 34 for a target area of interest. Following manual annotation of instances in this set, the TIR system 23 can be updated to accommodate the missed instances, either by expanding dictionaries with additional entries in the case of rule-based TIR systems, or by training on the new labeled samples in the case of ML systems. In an alternative embodiment, the TIR system 23 can be updated automatically to accommodate the missed instances, either by expanding dictionaries with additional entries in the case of rule-based TIR systems, or by training on the new labeled samples in the case of ML systems. As such, the TIR system 23 can be dynamically improved in a highly efficient manner, with minimal human effort for error analysis and annotation.

Figure 4:
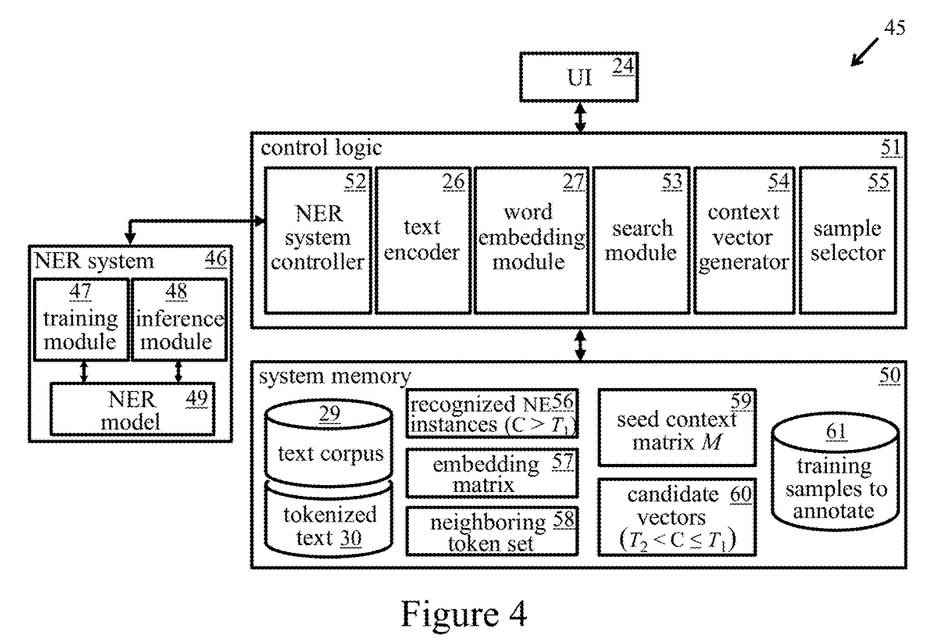
FIG. 4 illustrates component modules of an NER system management apparatus.

FIG. 4 is a more detailed illustration of component modules in a preferred management system 45. In this embodiment, the TIR system 23 comprises an NER system 46. The NER system 46 comprises a training module 47 and an inference module 48 for controlling training and inference operations respectively of an ML NER model 49. NER model 49 can be implemented in known manner, e.g. by a sequence model such as a CRF (Conditional Random Fields) model. Management system 45 comprises memory 50 and control logic 51 in which elements corresponding to those of FIG. 2 are indicated by like reference numerals. The TIR controller 25 of FIG. 2 is implemented here as NER controller 52 for the base NER system 46. The search/analysis module 28 of FIG. 2 is implemented here by a search module 53, a context vector generator 54 and a sample selector 55. Memory 50 contains data structures 56, 57, 58 and 61 corresponding generally to respective structures 31, 32, 33 and 34 of FIG. 2 apart from differences described below. Memory 50 also contains additional data structures explained below, namely a seed context matrix 59 and a set of candidate vectors 60, which are generated and used by modules 54 and 55 in operation.

Initial operation of system 45 proceeds generally as described for steps 35 to 38 of FIG. 3. NER controller 52 thus supplies text corpus 29 to inference module 48 of NER system 46, whereby NER model 49 processes the text corpus to identify instances of named entities ("NE instances" in the following). By way of example, text corpus 29 may comprise a large dataset of articles from on-line news archives, about 20,000 of which articles are generated every day. In general, NER model may be pretrained to recognize instances of one or more entity types (such as people, companies, locations, etc.) in the text. For each recognised NE instance, the NER model provides a confidence value C indicating the confidence with which that particular text was identified as an instance of the entity in question. Such confidence values are commonly provided by ML models, e.g. as a probability or percentage, for inference results. NER controller 52 then selects all recognized NE instances having confidence values above a first threshold T1 for inclusion in recognized instance set 56. This threshold T1 is typically set to a high value, e.g. 80%, and may be user-specified via UI 24 for a given operation. The tokenized text 30 is generated by text encoder 26 as described above, with selected NE instances in set 56 being encoded as single tokens. Embedding module 27 then generates the embedding matrix 57 from the encoded text as before.

Figure 5:
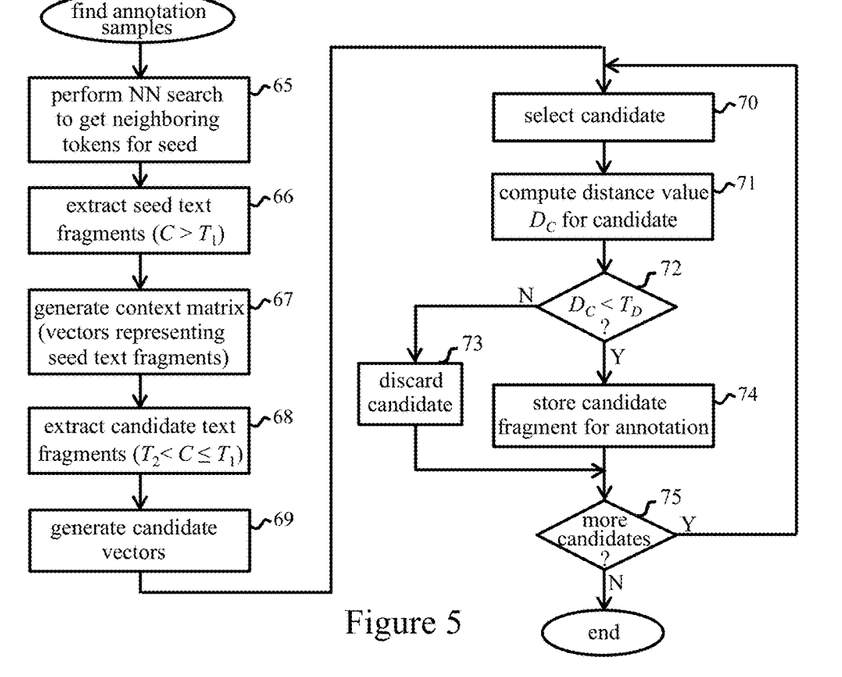
FIG. 5 indicates steps performed by the FIG. 4 apparatus.

After storing the embedding matrix, system 45 generates a set of annotation samples, i.e. fragments of text corpus 29 which are selected for annotation. Steps of this operation, which is initiated by user-selection of a seed token via UI 24, are illustrated in FIG. 5. In step 65, search module 53 performs a nearest-neighbor search of the embedding space to identify a set 58 of neighboring tokens as before. In step 66, the context vector generator 54 extracts from text corpus 29 a plurality S of text fragments. Each of these "seed text fragments" is a snippet, such as a sentence, of the text which includes a recognized NE instance (from set 56) corresponding to the seed token. These seed text fragments thus contain instances of the seed which were recognized with a confidence C>T1. The number S of these fragments may be selected as desired, e.g. by user input at UI 24, and might range from a number of order 10 to order 1000 depending on implementation and resources for a given operation. In step 67, context vector generator 54 then generates a vector representation of each seed text fragment based on a word-embedding of the fragment in an embedding space. These vectors can be generated in various ways, explained below, and effectively encode the context for the seed NE instance in each seed text fragment. The resulting vectors ("seed context vectors") make up the seed context matrix M, indicated at 59 in FIG. 4, of size (S×L) where L is the vector length.

In step 68, the sample selector 55 then extracts from text corpus 29 a plurality P of text fragments each of which includes text corresponding to a neighboring token in set 58. These "candidate text fragments" are selected only for neighboring tokens not already corresponding to recognized NE instances in set 56. In a simple implementation, sample selector 55 may select all, or a predetermined number, of the fragments (e.g. sentences) containing text corresponding to these neighboring tokens. In this preferred embodiment, however, the P candidate text fragments are selected from fragments which include text, corresponding to a neighboring token, which the MER model recognized as an NE instance with a confidence value between the first threshold T1 and a second, lower threshold T2. This threshold T2 thus defines a confidence band for the sample selection process and may be user-specified via UI 24 for a given operation.

In step 69 sample selector 55 then generates a vector representation of each candidate text fragment in like manner to generation of the seed context vectors in step 67. The resulting candidate vectors 60 are stored in system memory 50.

In step 70, the sample selector 55 selects a first candidate vector from candidate vectors 60. In step 71, the sample selector computes a distance value DC indicative of distance between that candidate vector and the vectors in seed context matrix M. In this embodiment, DC is computed as the maximum of the distances, computed as cosine similarities, between the candidate vector and each seed vector in matrix M. In decision step 72, selector 55 decides if the distance DC is less than a (predefined or user-selected) distance threshold TD. If not, ("N") at step 72, the candidate text fragment corresponding to that vector is discarded at step 73. Otherwise, in step 74 the candidate text fragment is stored in training sample set 61 as a text sample to be annotated. If there are further candidates to assess ("Y" at decision step 75), operation reverts to step 70 and the process is repeated for the next candidate. The selection process thus iterates, computing distance values DC for each candidate text fragment and storing fragments with distance values less than TD in training sample set 61. These text samples thus contain potential NE instances which the NER model recognized but with insufficient confidence values C, specifically confidence values in the range $T2<C\leq T1$.

The seed context vectors (and correspondingly the candidate vectors) can be generated by supplying each text fragment to a pretrained model which outputs a vector representing a location of the seed text fragment in an embedding space. To generate such a vector representation, one can, for example, aggregate vectors coming from a context-independent word embedding model, such as a Word2vec model. Other, more complex models (e.g. models based on the transformer architecture, such as Bidirectional Encoder Representations and Transformers (BERT)) can of course be employed here, and more generally any desired model can be used for generating vector representations of the text fragments. The resulting vectors thus encode the context for a seed NE instance in a seed text fragment (or neighboring token in a candidate text fragment). To focus more specifically on context, seed context vectors may be generated from the text remaining after removing the NE instance corresponding to the seed token from the seed text fragment. The candidate vectors are then similarly generated from candidate text fragments after removing the text corresponding to the neighboring tokens in those fragments. The length-L vectors may be generated, for example, by concatenating embedding vectors output by the aforementioned model for individual words in the fragment, or by computing an average (e.g. mean) of these vectors. In general, the word embedding employed for this process may be the same or different to that used to generate word embedding matrix M. For example, the seed context/candidate vectors may be generated by averaging the vectors in embedding matrix M for tokens in the corresponding text fragments.

Figure 6:
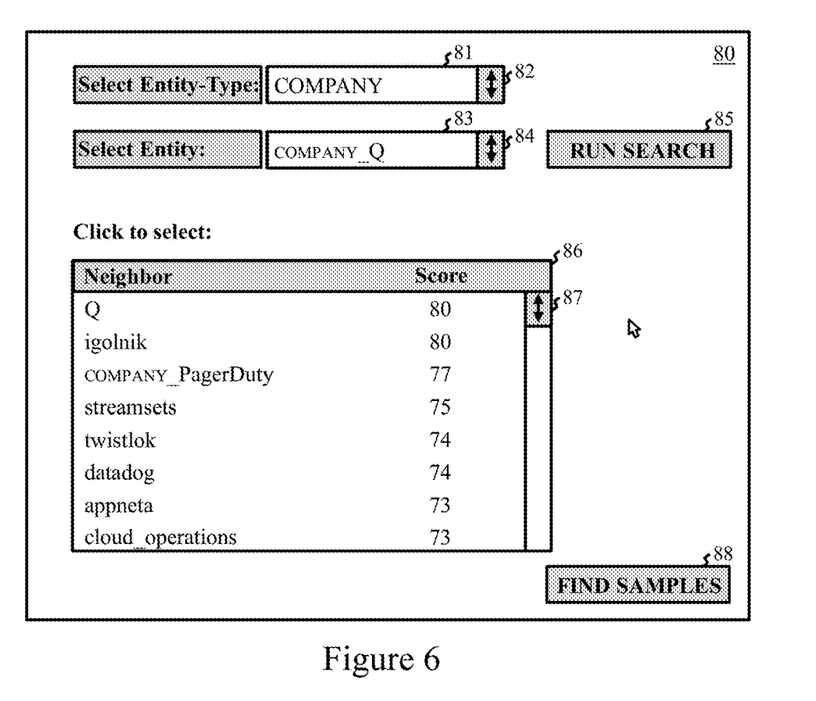
FIG. 6 shows an example of a graphical user interface provided by the FIG. 4 apparatus.

FIG. 6 illustrates key features of a GUI provided at user interface 24 in a preferred embodiment. The GUI 80 provides a window 81 for user input of an entity-type, here "COMPANY", for the sample selection process. A scroll-bar 82 allows selection from the available entity types. A window 83 allows selection of an NE instance corresponding to a seed token in set 56. A scroll-bar 84 allows scrolling through seed tokens alphabetically. After selecting a seed token, here "COMPANY_Q", clicking on icon 85 runs the nearest-neighbor search (step 65 of FIG. 5). The text corresponding to the neighboring tokens is then displayed as a list in window 86. This example shows that, in the neighborhood of seed COMPANY_Q, there are mentions of "Q" along with other items such as "datadog" and "twistlok" which may refer to companies in the cloud computing field. Items can be displayed here along with a "score" which indicates how close each token is, on a scale of 1 to 100, to the seed token in window 83. Another scroll bar 87 allows the user to view additional items in the list. In this embodiment, the user can click on items in window 86 to select a restricted set of neighboring tokens for steps 68 to 75 of FIG. 5. Clicking on icon 88 then runs the sample-selection process described above. This is illustrated schematically in FIG. 7 for the user-selected seed token COMPANY_Q. For each of the neighboring tokens, here for "Q" in user-selected list 90, candidate text fragments 91 are selected for the defined confidence band. These are then vectorized as described above to obtain the candidate vectors 92. Seed text fragments 93 are also vectorized to obtain the matrix M of seed context vectors 94. Candidate text fragments are then rejected, or stored as annotation samples, based on the computed distance DC.

Figure 7:
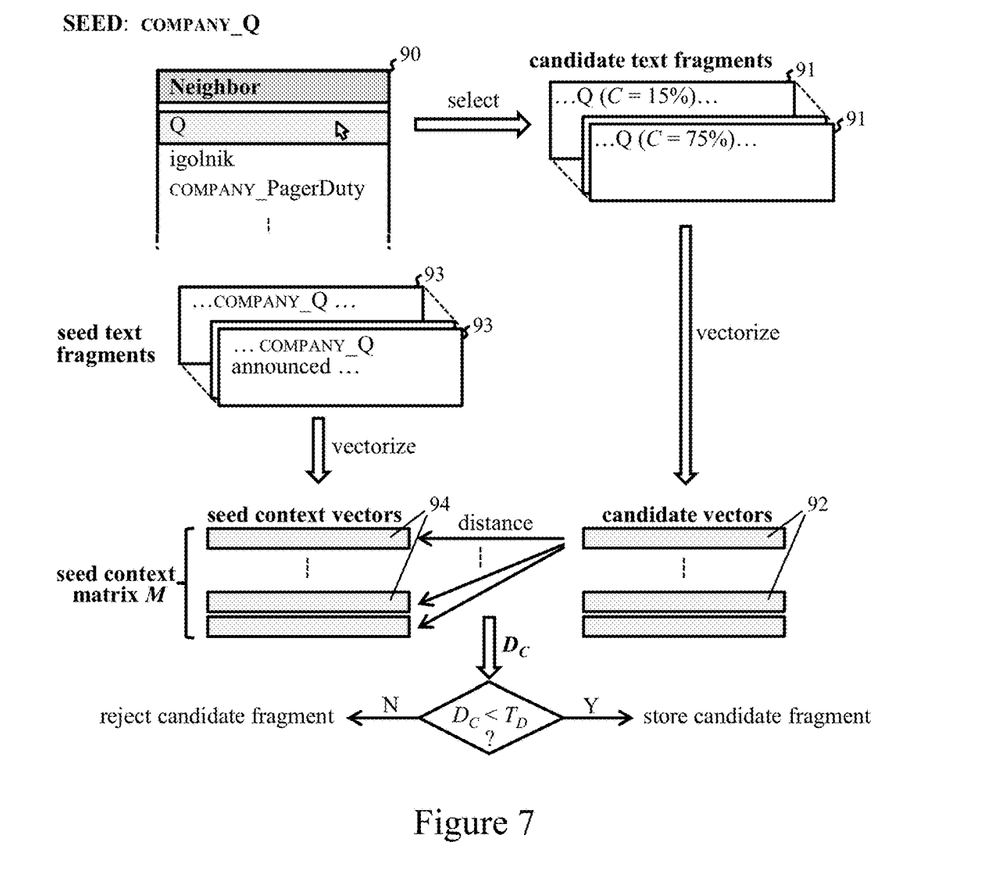
FIG. 7 illustrates the FIG. 5 process for an exemplary seed token.
Figure 8:
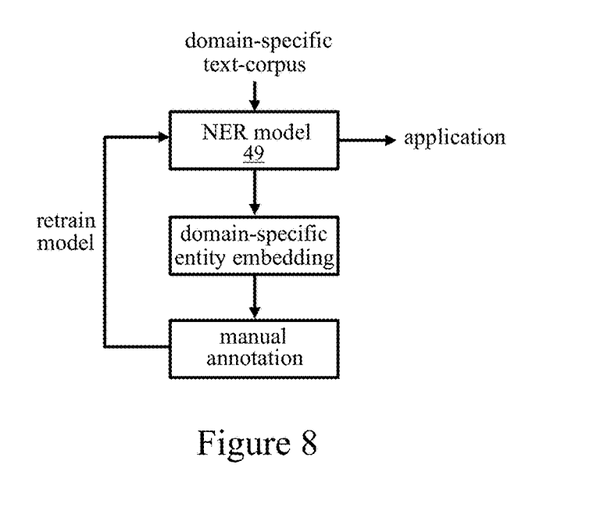
FIG. 8 illustrates a training loop for an NER system.

The above process can be repeated for each of a plurality of seed tokens selected via GUI 80, allowing sample selection to be targeted on particular areas of interest. The sample selection can also be tuned by confidence band via the thresholds T1 and T2 with a view to increasing model confidence on particular entities of interest. Using the maximum distance value DC above also allows text samples in training sample set 61 to be ranked according to distance, whereby a subset of the "best" samples can be selected for annotation if annotation resources are limited. The schematic of FIG. 8 illustrates the high-level management workflow for system 45. This workflow is a loop in which domain specific embedding matrix 57 is trained using the inference results from NER model 48. Text samples in training sample set 61 are then provided for manual annotation. In response to annotation of a set of these samples, e.g. via a UI 24, the NER controller 52 supplies the resulting training samples to NER system 46 for further training of model 49 by training module 47. The model can thus be dynamically improved in a required manner, and the process can be iterated for text corpora in additional domains to enhance model operation for a range of applications. This system allows targeted ground truth data (new training data) to be generated for NER model 48 as required, and customer-specific accuracy issues to be addressed by continued management and training of the model.

It will be appreciated that numerous changes and modifications can be made to the exemplary embodiments described above. For example, system 45 can be readily applied to a rule-based NER system, such as NER system 48, in which case annotation of training samples is performed to augment dictionaries of entities, i.e. to perform dictionary expansion. While the above embodiments focus on NER systems, the processes described may be applied to any type of TIR system as previously explained.

Distance metrics other than cosine similarity, e.g. Euclidean distance, may of course be used to measure distance between vectors in the embedding space. Also, while user-selection of seed tokens is preferred for focusing selection of annotation samples, embodiments might be envisaged in which the search and sample selection process is performed automatically for all item-instances in recognized instance set 31, 56.

Steps of flow diagrams may be implemented in a different order to that shown, and some steps may be performed in parallel where appropriate. In general, where features are described herein with reference to a method embodying the invention, corresponding features may be provided in a computing apparatus/computer program product embodying the invention, and vice versa.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing a text-item recognition system, the method comprising:
    applying said system to a text corpus containing instances of text items to be recognized by the system;
    selecting from the text corpus a set of instances of text items which the system recognized;
    tokenizing the text corpus such that each instance in said set is encoded as a single token;
    processing the tokenized text via a word embedding scheme to generate a word embedding matrix comprising vectors which indicate locations of respective tokens in a word embedding space;
    in response to selection of a seed token corresponding to an instance in said set, performing a nearest-neighbor search of an embedding space to identify a set of neighboring tokens for the seed token;
    for at least a subset of the neighboring tokens, identifying the text corresponding to each neighboring token as a potential instance of a text item to be annotated; and
    targeting an annotation effort on a particular area of interest based on a set of identified potential instances of text items within the text corpus that are likely to improve said system, wherein the annotation effort includes a manual annotation of each instance of the set of identified potential instances of text items, and wherein said system is a rule-based text-item recognition system.

2. The computer-implemented method as claimed in claim 1 wherein said system provides a confidence value for each instance of a text item recognized by the system, the method including selecting instances of text items having confidence values above a threshold for inclusion in said set of instances.

3. The computer-implemented method as claimed in claim 1 wherein said system comprises a named-entity recognition system and said instances of text items comprise instances of named entities.

4. The computer-implemented method as claimed in claim 1 wherein said system comprises a machine learning model, the method including, for text identified as a said potential instance of a text item, storing at least one fragment of the text corpus which includes that text as a text sample to be annotated.

5. The computer-implemented method as claimed in claim 4 including, in response to annotation of a set of said text samples, training the model on the set of annotated text samples.

6. The computer-implemented method as claimed in claim 1 including:
 extracting from the text corpus a plurality of seed text fragments each comprising a fragment of the text corpus which includes an instance corresponding to said seed token;
 generating a vector representation of each seed text fragment based on a word-embedding of the fragment in an embedding space;
 extracting from the text corpus a plurality of candidate text fragments each comprising a fragment of the text corpus which includes text corresponding to a neighboring token;
 generating a said vector representation of each candidate text fragment;
 computing, for each candidate text fragment, a distance value indicative of distance between the vector representation of that candidate text fragment and the vector representations of the seed text fragments; and
 identifying the text corresponding to the neighboring token in each candidate text fragment with less than a threshold distance value as a said potential instance of a text item to be annotated.

7. The computer-implemented method as claimed in claim 6 wherein said system provides a confidence value for each instance of a text item recognized by the system, the method including:
 selecting instances of text items having a confidence value above a first threshold for inclusion in said set of instances; and
 selecting said candidate text fragments from text fragments which include text, corresponding to a neighboring token, that the system recognized as an instance of a text item with a confidence value between the first threshold and a second, lower threshold.

8. The computer-implemented method as claimed in claim 6 wherein said system comprises a machine learning model, the method including storing each candidate text fragment with less than a threshold distance value as a text sample to be annotated.

9. The computer-implemented method as claimed in claim 8 including, in response to annotation of a set of said text samples, training the model on the set of annotated text samples.

10. The computer-implemented method as claimed in claim 6 including:
 generating said vector representation of each seed text fragment after removing the instance corresponding to the seed token in that fragment; and
 generating said vector representation of each candidate text fragment after removing the text corresponding to the neighboring token in that fragment.

11. The computer-implemented method as claimed in claim 6 including generating said vector representation of a fragment by supplying that fragment to a pretrained word-embedding model.

12. The computer-implemented method as claimed in claim 1 including providing a user interface for user-selection of said seed token via selection of an instance from said set of instances of text items which the system recognized.

13. The computer-implemented method as claimed in claim 12 including, in response to user-selection of a plurality of seed tokens via the user interface, performing said nearest-neighbor search, and identifying text corresponding to at least said subset of the neighboring tokens identified by that search, for each of those seed tokens.

14. The computer-implemented method as claimed in claim 12 including, after performing the nearest-neighbor search for the seed token to identify said set of neighboring tokens, displaying in the interface the text corresponding to each neighboring token for user-selection of a restricted set of neighboring tokens.

15. A computer program product for managing a text-item recognition system, the computer program product comprising a computer readable storage medium having program instructions embodied therein, the program instructions being executable by a computing apparatus to cause the computing apparatus to:
 apply said system to a text corpus containing instances of text items to be recognized by the system;
 select from the text corpus a set of instances of text items which the system recognized;
 tokenize the text corpus such that each instance in said set is encoded as a single token;
 process the tokenized text via a word embedding scheme to generate a word embedding matrix comprising vectors which indicate locations of respective tokens in a word embedding space;
 in response to selection of a seed token corresponding to an instance in said set, perform a nearest-neighbor search of the embedding space to identify a set of neighboring tokens for the seed token;
 for at least a subset of the neighboring tokens, identify the text corresponding to each neighboring token as a potential instance of a text item to be annotated for improving operation of the system; and
 target an annotation effort on a particular area of interest based on a set of identified potential instances of text items within the text corpus that are likely to improve said system, wherein the annotation effort includes a manual annotation of each instance of the set of identified potential instances of text items, and wherein said system is a rule-based text-item recognition system.

16. The computer program product as claimed in claim 15 wherein said system provides a confidence value for each instance of a text item recognized by the system, said program instructions being adapted to cause the computing apparatus to select instances of text items having confidence values above a threshold for inclusion in said set of instances.

17. The computer program product as claimed in claim 15 wherein said program instructions are adapted to cause the computing apparatus to:
 extract from the text corpus a plurality of seed text fragments each comprising a fragment of the text corpus which includes an instance corresponding to said seed token;
 generate a vector representation of each seed text fragment based on a word-embedding of the fragment in an embedding space;
 extract from the text corpus a plurality of candidate text fragments each comprising a fragment of the text corpus which includes text corresponding to a neighboring token;
 generate a said vector representation of each candidate text fragment;
 compute, for each candidate text fragment, a distance value indicative of distance between the vector representation of that candidate text fragment and the vector representations of the seed text fragments; and identify the text corresponding to the neighboring token in each candidate text fragment with less than a threshold distance value as a said potential instance of a text item to be annotated.

18. The computer program product as claimed in claim 17 wherein said system provides a confidence value for each instance of a text item recognized by the system, said program instructions being further adapted to cause the computing apparatus to:
    select instances of text items having a confidence value above a first threshold for inclusion in said set of instances; and
    select said candidate text fragments from text fragments which include text, corresponding to a neighboring token, that the system recognized as an instance of a text item with a confidence value between the first threshold and a second, lower threshold.

19. The computer program product as claimed in claim 17 wherein said system comprises a machine learning model, said program instructions being further adapted to cause the computing apparatus to:
    store each candidate text fragment with less than a threshold distance value as a text sample to be annotated; and
    in response to annotation of a set of said text samples, train the model on the set of annotated text samples.

20. A computing apparatus for managing a text-item recognition system, the apparatus comprising memory for storing a text corpus containing instances of text items to be recognized by the system, and control logic adapted to:
    apply said system to the text corpus;
    select from the text corpus a set of instances of text items which the system recognized;
    tokenize the text corpus such that each instance in said set is encoded as a single token;
    process the tokenized text via a word embedding scheme to generate a word embedding matrix comprising vectors which indicate locations of respective tokens in a word embedding space;
    in response to selection of a seed token corresponding to an instance in said set, perform a nearest-neighbor search of the embedding space to identify a set of neighboring tokens for the seed token;
    for at least a subset of the neighboring tokens, identify the text corresponding to each neighboring token as a potential instance of a text item to be annotated for improving operation of the system; and
    target an annotation effort on a particular area of interest based on a set of identified potential instances of text items within the text corpus that are likely to improve said system, wherein the annotation effort includes a manual annotation of each instance of the set of identified potential instances of text items, and wherein said system is a rule-based text-item recognition system.

* * * * *